United States Patent [19]

Rehfeld

[11] Patent Number: 4,459,122
[45] Date of Patent: Jul. 10, 1984

[54] TWO BALL UNIVERSAL JOINT

[75] Inventor: Frederick L. J. Rehfeld, Saginaw, Mich.

[73] Assignee: General Motors Corporation, Detroit, Mich.

[21] Appl. No.: 361,185

[22] Filed: Mar. 24, 1982

[51] Int. Cl.³ .............................................. F16D 3/24
[52] U.S. Cl. .................................... 464/143; 403/114; 464/906
[58] Field of Search ............... 464/139, 141, 143, 145, 464/142, 906, 147, 150, 152; 403/57, 74, 76, 114

[56] References Cited

U.S. PATENT DOCUMENTS

| 1,331,775 | 2/1920 | Lavigne | 464/139 |
| 1,975,758 | 10/1934 | Stuber . | |
| 2,046,584 | 7/1936 | Rzeppa . | |
| 2,427,237 | 9/1947 | Suczek | 464/139 |
| 2,432,216 | 12/1947 | Suczek | 464/906 X |
| 2,579,356 | 12/1951 | Anderson . | |
| 3,162,026 | 12/1964 | Ritsema | 464/906 X |
| 3,186,189 | 6/1965 | Cull . | |
| 3,263,448 | 8/1966 | Adams | 464/906 X |
| 3,368,370 | 2/1968 | Gravel | 464/906 X |
| 3,520,152 | 7/1970 | Schmid . | |
| 3,564,868 | 2/1971 | Wildhaber | 464/141 |

Primary Examiner—Stuart S. Levy
Assistant Examiner—Daniel P. Stodola
Attorney, Agent, or Firm—F. J. Fodale

[57] ABSTRACT

A universal joint comprises inner and outer drive members, two drive balls located in the complementary funnel-shaped ball grooves of the inner and outer drive members and a pilot member which engages for the two drive balls to locate the drive balls in cooperation with the complementary funnel-shaped grooves.

The two drive balls are 180° apart and the pilot member is hinge-connected to the inner drive member for pivotal movement solely about an axis which is perpendicular to an axis through the center of the two drive balls.

2 Claims, 5 Drawing Figures

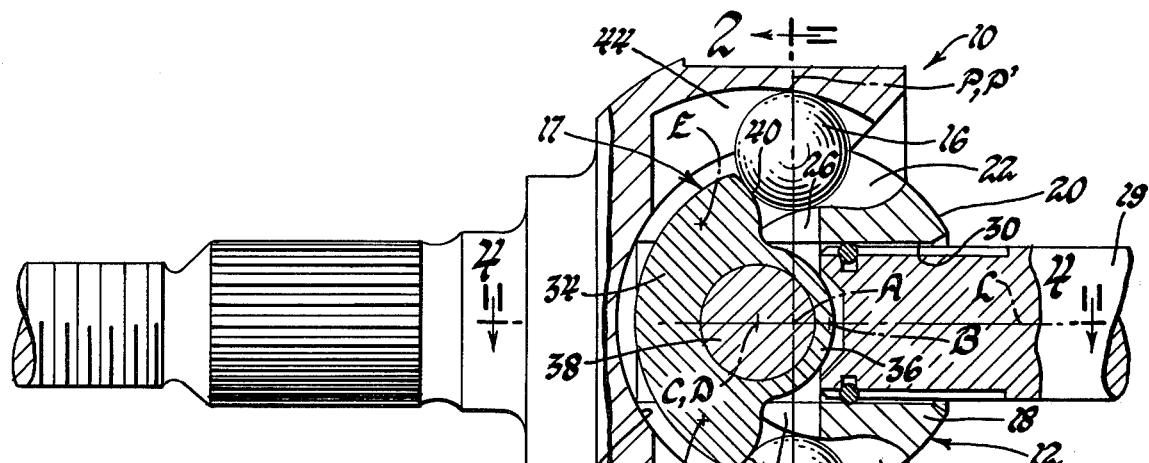
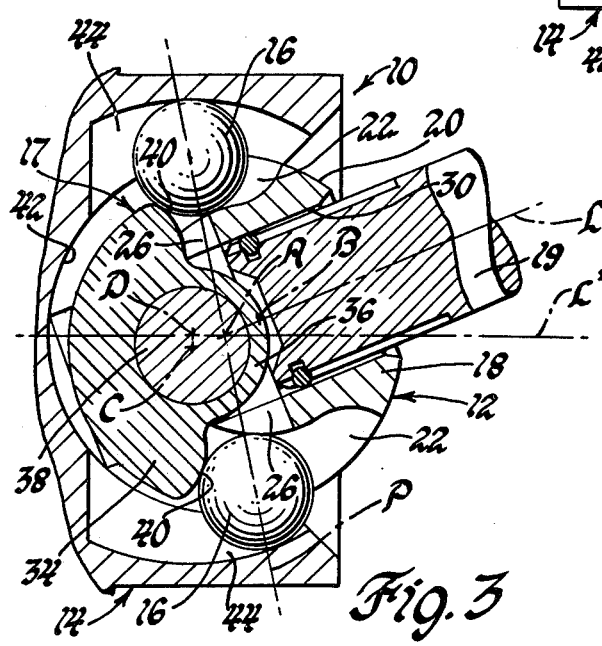
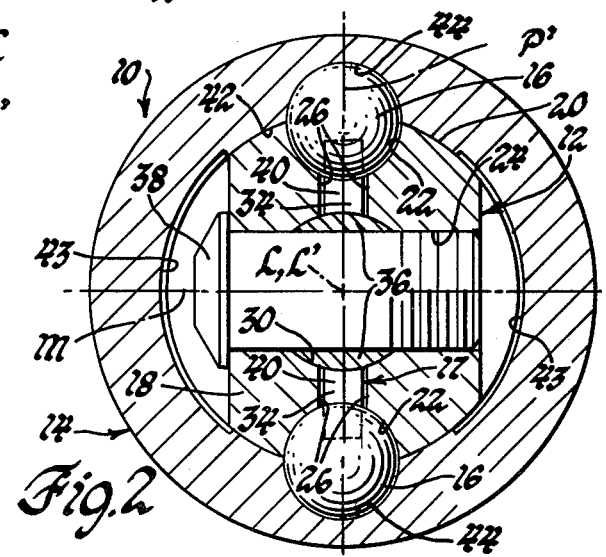
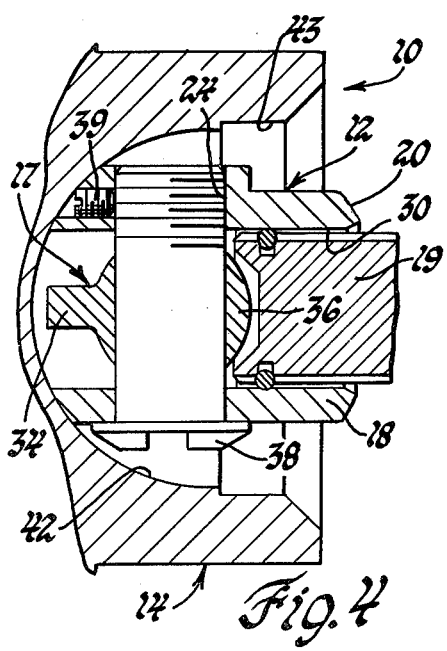
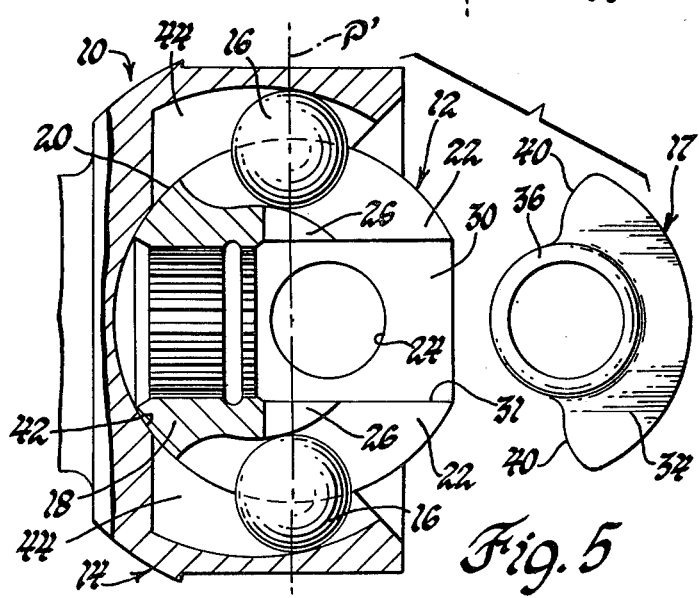

TWO BALL UNIVERSAL JOINT

This invention relates generally to universal joints and, more particularly, to universal joints which have drive balls located in complementary ball grooves in inner and outer drive members for transferring torque between the drive members.

It is well known that such universal joints transmit constant velocity or substantially constant velocity when the drive balls are located in a plane which bisects or substantially bisects the angle formed by the axes of the inner and outer drive members when the universal joint is bent at an angle.

It is also well known that the drive balls can be located in such a plane by means of funnel-shaped ball grooves and a universally moveable pilot member which acts on the drive balls to maintain the balls coplanar at all joint angles. See for instance, U.S. Pat. No. 1,975,758 (Stuber)—FIG. 8; U.S. Pat. No. 2,046,584 (Rzeppa)—FIG. 4 and U.S. Pat. No. 2,579,356 (Anderson).

In these prior art universal joints, however, six drive balls are commonly used and at least three drive balls are required in order to control the position of the universally moveable pilot member.

The object of this invention is to provide a universal joint which operates on the funnel groove principle with only two drive balls and a pilot member which acts on the two drive balls to maintain their proper relative position at all joint angles. This is generally accomplished by hinging the pilot member on one of the drive members, preferably the inner drive member, so that it pivots solely about one axis which is transverse to an axis through the center of the two drive balls.

Other objects and features of the invention will become apparent to those skilled in the art as the disclosure is made in the following detailed description of a preferred embodiment of the invention as illustrated in the accompanying sheet of drawing in which:

FIG. 1 is a longitudinal section of a universal joint in accordance with this invention.

FIG. 2 is a section taken substantially along the line 2—2 of FIG. 1 looking in the direction of the arrows.

FIG. 3 is a longitudinal section showing the universal joint bent at an angle.

FIG. 4 is a section taken substantially along the line 4—4 of FIG. 1 looking in the direction of the arrows.

FIG. 5 is a longitudinal section showing the universal joint partially assembled.

Referring now to the drawing, the universal joint 10 comprises an inner drive member 12, an outer drive member 14, a pair of drive balls 16 which are 180° apart and a hinged pilot member 17 for controlling the relative position of the drive balls 16.

The inner drive member 12 comprises a head 18 having an outer spherical surface 20 and a pair of diametrically opposed ball grooves 22. The center of the spherical surface 20 lies on the longitudinal axis L of the inner drive member 12 and it coincides with the joint center A about which drive members 12 and 14 universally pivot with respect to each other. The ball grooves 22 are curved meridian grooves which have a center B which lies on the longitudinal axis L and is offset from the joint center A.

The head 18 has a longitudinal bore 30 which is concentric with the longitudinal axis L. The inner or forward end of the longitudinal bore 30 intersects the ball grooves 22 to form a slot 31 at the deep end of each ball groove 22 as shown in FIG. 5. The head 18 also has radial slots 26 between the medial portion of longitudinal bore 30 and the medial portion of the ball groove 22. See FIGS. 2 and 5. The slots 26 and 31 are the same width and permit portions of the pilot member 17 to protrude into the ball grooves 22 and engage the drive balls 16.

The outer or rearward end of the longitudinal bore 30 is splined for connecting a drive shaft 19 to the head 18.

The head 18 also has a cross bore 24 which has an axis M which is perpendicular to, that is 90°, from the axis P′ through the centers of the drive balls 16 in the diametrically opposed ball grooves 22 as shown in FIG. 2. The axis M of the cross bore 24 intersects the longitudinal axis L of the inner drive member 12 at a center C which is offset from the joint center A. Centers B and C are on opposite sides of the joint center A and spaced from the joint center A by equal amounts. This precise location of center C is not essential. However, the described location is preferred because it strikes a good balance for the strength of the head 18 and the pilot member 17 which are effected by the location of center C. Also, while the axes M and P′ must be transverse to each other, it is not essential that they be orthogonal. The advantage of the orthogonal relation is that it simplifies the geometry of the pilot member 17.

As indicated above, the pilot member 17 is hinged to the head 18 for controlling the relative position of the two drive balls 16. More specifically, the pilot member 17 comprises a flat sector-shaped body 34 and a ball-shaped hinge socket 36. The hinge socket 36 is disposed in the longitudinal bore 30 and is hinge-connected to the head 18 by a hinge pin 38 secured in the cross bore 24. The pilot member 17 thus pivots solely about the axis of the cross bore 24.

The flat sector-shaped body 34 protrudes into the ball grooves 22 via slots 26 and 31 and has a pair of generally radial convex control surfaces 40 which engage the respective drive balls 16.

The control surfaces 40 are generated so that the drive balls 16 are contacted at any joint angle when the centers of the drive balls 16 are located in the plane P which is established by the shape of the ball grooves in the inner and outer drive members 12 and 14. The precise shape of the control surface 40 can be determined by known layout techniques. In this regard, it is possible to shape the control surfaces 40 as circular arcs or nearly circular arcs by judiciously choosing the pair of centers E and E′ from centers which are equidistant from center C and also equidistant from the respective ball centers.

The outer drive member 14 has an inner spherical surface 42 which is concentric with the joint center A and mates with the outer spherical surface 20 of the head 18 so that the head 18 pivots in the outer drive member 14 about the joint center A. The inner surface of the outer drive member 14 also has diametrically opposed assembly grooves 43 which extend in from the open end of the outer drive member to facilitate assembly of the head 18 into the outer drive member 14.

The outer drive member 14 also has a pair of diametrically opposed ball grooves 44 in spherical surface 42 which complement the ball grooves 22 of the inner drive member 12. The ball grooves 44 are curved meridian grooves which have a center D which lies on the longitudinal axis L′ of the outer drive member 14 and is offset from the joint center A. Centers B and D are on opposite sides of the joint center A and spaced therefrom by equal amounts. Centers C and D also coincide when the drive members 12 and 14 are aligned as shown in FIG. 1.

Because the centers B and D are equally offset on opposite sides of the joint center A, the ball grooves 22 and 44 help locate the drive balls 16 in the homokinetic plane P when the universal joint is bent at an angle in accordance with well known principles.

In some cases, the centers B and D may not be equally offset for one design reason or another. In such cases, the balls are not also located in the homokinetic plane resulting in a tolerance variance in constant velocity operation. However, the principles of the invention are equally applicable to such variations. It should also be noted that while the ball grooves 22 and 24 are of the curved funnel-type, as shown in the aforesaid Rzeppa patent, linear funnel grooves of the type shown in the Anderson patent can also be used.

When the universal joint 10 is bent at an angle as shown in FIG. 3, the funnel angle of the upper set of the ball grooves 22,44 decreases and the upper set of ball grooves 22,44 squeeze the upper drive ball 16 to the left into the homokinetic plane P which bisects the joint angle in accordance with well known principles. At the same time, the funnel angle of the lower set of ball grooves 22,44 increases which allows but does not force the lower drive ball 16 to move to the right and also locate in the homokinetic plane. But since the two drive balls 16 are linked by the hinged pilot member 17, the lower drive ball 16 is forced to the right into the homokinetic plane where the upper drive ball 16 is located therein by the upper set of ball grooves 22, 44. As the bent universal joint rotates, the roles of the two balls shift and reverse after 180° of rotation. At any rotational position, however, at least one drive ball is located in the homokinetic plane by its ball grooves and, consequently, both drive balls are so located because of the link provided by the hinged pilot member 17.

The universal joint 10 is assembled in the following manner. The spherical surface 20 of the head 18 is aligned with the assembly grooves 43 and the head 18 is inserted into the outer drive member 14. The head 18 is then rotated 90° about the longitudinal axis L' to an upright position such as shown in FIG. 2.

The head 18 is then positioned so that the front end of the longitudinal bore 30 is at the open end of the outer drive member 14, as shown in FIG. 5. This is backwards from the normal position of the head 18. The balls 16 are then inserted into the complementary pairs of grooves 22 and 44. The ball-shaped hinge socket 36 of the pilot member 17 is then inserted into the longitudinal bore 30 until the sector-shaped body 34 engages the drive balls 16 and the bore of socket 36 aligns with the cross bore 24.

The head 18 is then pivoted on the balls 16 approximately 45°, from the position shown in FIG. 5, about an axis P' which intersects the centers of the balls 16 and which is in the homokinetic plane P. The hinge pin 38 is then inserted into the cross bore 24 and tightened. The head 18 is then pivoted back about 45° to the position shown in FIG. 5 and the set screw 39 is tightened.

The head 18 is then pivoted on the balls 16, 180° about the axis P', to the position shown in FIG. 1. The shaft 19 is then connected to the head 18.

It should be noted that the drive balls 16 are 180° apart which simplifies the geometry of the parts considerably. This feature is also essential to assembly of the universal joint 10 if a one-piece housing as indicated above. However, the drive balls theoretically do not have to be 180° apart.

Also, the two ball universal joint described above is a "cageless" type, that is, the head 20 pivots directly in the outer drive member. This construction offers the advantage of deeper ball grooves and a high torque capacity. However, universal joints of the funnel groove-type having a ball cage which is between inner and outer drive members and pivots universally about the joint center are also known, for instance, from FIGS. 3 and 5 of U.S. Pat. No. 2,406,584 (Rzeppa). In these constructions, the cage is the universally moveable pilot member which maintains the drive balls coplanar. Such a cage may be used in place of the pilot member 17 if a high torque capacity is not required. However, the cage must be hinge connected to the inner drive member 12 so that it pivots solely about one axis which is transverse to an axis through the center of the two drive balls. This can be accomplished simply by locating the cross bore 24 at the joint center A and connecting the cage to the head 18 by a hinge pin.

It is also possible to provide a pilot member which is hinge-connected to the outer drive member so that it pivots solely about an axis which is transverse to the axis through the center of the two drive balls.

Other obvious modifications will occur to a person skilled in the art and, consequently, I wish it to be understood that I do not desire to be limited to the exact details of construction shown and described.

The embodiment of the invention in which an exclusive property or privilege is claimed are defined as follows:

1. A universal joint comprising inner and outer drive members having complementary funnel-shaped ball grooves, drive balls located in the complementary funnel-shaped ball grooves for transferring torque between the inner and outer drive members, and a pilot member for maintaining the drive balls coplanar, characterized in that, the universal joint has two drive balls which are spaced 180° apart, and the pilot member comprises a sector-shaped body which engages the two drive balls and a ball-shaped hinge socket, which is located in a longitudinal bore of the inner drive member and hinge-connected to one of the drive members for pivotal movement solely about an axis which is perpendicular to an axis through the center of the two drive balls and which is offset from the joint center about which the inner and outer drive member pivot with respect to each other.

2. A universal joint according to claim 1 wherein the pilot member is hinge-connected to the inner drive member.

* * * * *